United States Patent
Swann et al.

(10) Patent No.: US 9,781,676 B2
(45) Date of Patent: Oct. 3, 2017

(54) SYSTEM AND METHOD FOR REDUCING POWER CONSUMPTION BASED ON DATA ACTIVITY SENSITIVE TIMERS

(71) Applicant: RESEARCH IN MOTION LIMITED, Waterloo (CA)

(72) Inventors: Craig Ian Haight Swann, Waterloo (CA); Joseph Tu-Long Deu-Ngoc, Maryhill (CA)

(73) Assignee: BlackBerry Limited, Waterloo (CA)

( * ) Notice: Subject to any disclaimer, the term of this patent is extended or adjusted under 35 U.S.C. 154(b) by 414 days.

(21) Appl. No.: 13/752,759

(22) Filed: Jan. 29, 2013

(65) Prior Publication Data
US 2014/0112223 A1    Apr. 24, 2014

Related U.S. Application Data

(60) Provisional application No. 61/718,028, filed on Oct. 24, 2012.

(51) Int. Cl.
*H04W 52/02* (2009.01)
*H04W 76/06* (2009.01)
*H04W 72/12* (2009.01)

(52) U.S. Cl.
CPC ..... *H04W 52/0251* (2013.01); *H04W 52/028* (2013.01); *H04W 76/068* (2013.01); *H04W 72/1221* (2013.01); *Y02B 60/50* (2013.01)

(58) Field of Classification Search
CPC ............. H04W 76/068; H04W 52/028; H04W 52/0261; H04W 28/02; H04W 72/1221; H04L 12/40039
See application file for complete search history.

(56) References Cited

U.S. PATENT DOCUMENTS

| 5,940,771 A | 8/1999 | Gollnick et al. |
| 6,137,789 A | 10/2000 | Honkasalo |
| 6,748,247 B1 | 6/2004 | Ramakrishnan et al. |

(Continued)

FOREIGN PATENT DOCUMENTS

| EP | 1973355 A1 | 9/2008 |
| EP | 2355610 A1 | 8/2011 |
| WO | 9808646 | 3/1998 |

OTHER PUBLICATIONS

Examiner's Report dated Apr. 1, 2015, issued from the corresponding Canadian patent application No. 2,831,112.

(Continued)

*Primary Examiner* — Rednetor Pasia
(74) *Attorney, Agent, or Firm* — Borden Ladner Gervais LLP; Todd Keeler

(57) ABSTRACT

Where a source of data has a time at which it is to transmit data, if it has data to transmit, for example as determined by a timer, this time is advanced when there is an active data connection. In this manner, rather than the data connection being torn down, and then immediately set up again, the data can be transmitted before the connection is torn down. In some embodiments, a history is maintained in terms of how long data connections are maintained. Then, once data transmission on an active connection ceases, the times are advanced, or not, depending on a likelihood that the connection will stay up for some further period of time.

21 Claims, 6 Drawing Sheets

(56) References Cited

U.S. PATENT DOCUMENTS

| | | | |
|---|---|---|---|
| 7,269,660 B1* | 9/2007 | Westfield | H04L 67/125 709/223 |
| 7,826,478 B2 | 11/2010 | Zhao | |
| 7,961,703 B2* | 6/2011 | Suzuki | H04W 76/045 370/338 |
| 8,300,573 B2 | 10/2012 | Lindskog et al. | |
| 2006/0148469 A1* | 7/2006 | Kim | H04W 52/0229 455/426.1 |
| 2008/0117891 A1 | 5/2008 | Damnjanovic et al. | |
| 2008/0198871 A1 | 8/2008 | Shahidi et al. | |
| 2009/0017879 A1 | 1/2009 | Tsfaty et al. | |
| 2009/0124212 A1 | 5/2009 | Islam et al. | |
| 2011/0111708 A1 | 5/2011 | Tu et al. | |
| 2011/0249575 A1 | 10/2011 | Dwyer et al. | |
| 2012/0051289 A1 | 3/2012 | Dwyer et al. | |
| 2012/0120799 A1* | 5/2012 | Brisebois | H04W 4/001 370/231 |
| 2012/0122405 A1 | 5/2012 | Gerber et al. | |
| 2012/0159209 A1* | 6/2012 | Stemen | G06F 9/4893 713/320 |
| 2012/0167118 A1* | 6/2012 | Pingili | G06F 1/3206 719/318 |
| 2012/0320811 A1 | 12/2012 | Islam et al. | |
| 2013/0067495 A1* | 3/2013 | Singh | G06F 9/485 719/318 |
| 2013/0191541 A1* | 7/2013 | Kishan | G06F 9/5011 709/226 |
| 2013/0191544 A1* | 7/2013 | Caldeira de Andrada | H04L 67/325 709/226 |
| 2013/0254256 A1* | 9/2013 | Fu | H04L 67/10 709/201 |
| 2013/0308690 A1* | 11/2013 | Kalla | H04W 52/0216 375/222 |
| 2014/0064134 A1* | 3/2014 | Huang | H04W 76/068 370/253 |
| 2014/0068307 A1* | 3/2014 | Koskinen | H04W 52/0209 713/323 |

OTHER PUBLICATIONS

"Universal Mobile Telecommunications System (UMTS); Radio Resource Control (RRC); Protocol Specification (3GPP TS 25.331 version 8.20.0 Release 8)", Technical Specification, European Telecommunications Standards Institute (ETSI), 650, Route Des Lucioles; F-06921 Sophia-Antipolis; France, vol. 3GPP RAN 2, No. V8.20.0, Oct. 1, 2012 (Oct. 1, 2012), XP014092965, *8.1.14*.

Gupta et al., "Reliable Multicast MAC Protocol for Wireless LANs", IEEE, 2003, pp. 93-97, Retrieved from the Internet at: http://citeseerx.ist.psu.edu/viewdoc/download?doi=10.1.1.9.6857&rep=rep1&type=pdf.

Lopez-Aguilera et al, "A Transmit Power Control Proposal for IEEE 802.11 Cellular Networks", 6th International Workshop on on Applications and Services in Wireless Networks, IEEE. Retrieved from the Internet at: http://upcommons.upc.edu/eprints/bitstream/2117/1417/1/lopezaswn06.pdf, on Apr. 26, 2013.

"Signaling connection release indication procedure", Universal Mobile Telecommunications System (UMTS); Radio Resource Control (RRC); Protocol specification (3GPP TS 25.331 version 8.9.0 Release 8), ETSI TS 125 331 V8.9.0 (Feb. 2010), pp. 143-145.

"Enhanced SCRI approach for fast dormancy", R2-087149, 25.331 CR 3483, rev 2, 8.4.0, TSG-RAN WG2, 3GPP TSG-RAN2 Meeting #64, Prague, Czech Republic, Nov. 10-14, 2008.

Office Action dated Jun. 23, 2015, issued from the corresponding European patent application No. 13153143.6.

Examiner's Report dated Jan. 20, 2016, issued from the corresponding Canadian patent application No. 2,831,112.

* cited by examiner

SYSTEM AND METHOD FOR REDUCING POWER CONSUMPTION BASED ON DATA ACTIVITY SENSITIVE TIMERS

FIELD

The application relates to the transmission of data by a mobile device, or reception of data by a mobile device.

BACKGROUND

Some mobile devices, such as mobile devices operating in 3G networks, are running an increasingly large number of applications. Furthermore, in true multi-tasking environments, these applications are running simultaneously, and may introduce their own timers for various purposes, e.g. polling or keep-alive. These timers, in conjunction with regular user activity, result in an increased number of short data transmissions.

To transmit data, a data connection must exist. If it does not exist, then it must be established, for example a PS RAB (packet switched radio access bearer). There is a signaling protocol associated with data connection establishment. When there is no more data to transmit, the data connection is released. There is also a signaling protocol associated with data connection release. The establishment and release of the data connection takes time, for example about one second or more in some implementations.

When the radio wakes up, for example for periodic/non-periodic network service events, or for timer based periodic/non-periodic background application data transmission, it is entirely possible that immediately after the device goes back to idle, another event requiring the radio to wake up could occur. The result is increased radio activity, using more power as the connection needs to be setup again immediately.

Examples of applications that might perform background polling include Facebook™, Twitter™, and WeatherEye™. Another example of non-user initiated polling is the keep-alive/ping transmissions that take place for always-on applications or devices. Such devices may have an always-on PDP (packet data protocol) context. The mobile device uses a keep-alive/ping mechanism to prevent the PDP context from being closed by the network.

DETAILED DESCRIPTION

Figure 1:
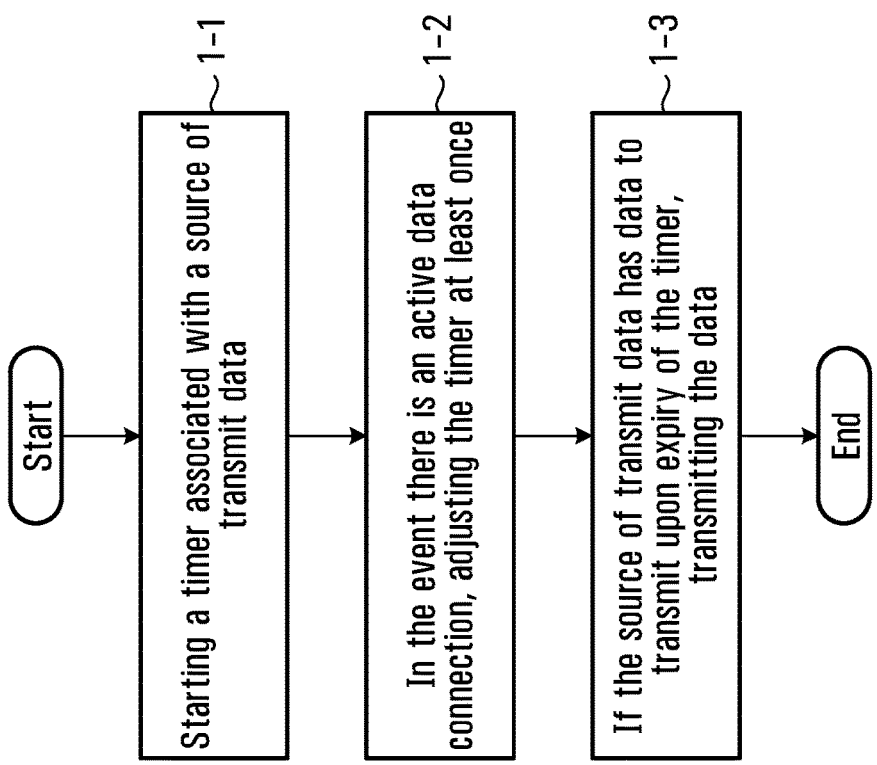
FIG. 1 is a flowchart of a method of transmitting data based on timers.

The embodiments set forth below represent the necessary information to enable those skilled in the art to practice the claimed subject matter and illustrate the best mode of practicing such subject matter. Upon reading the following description in light of the accompanying figures, those skilled in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to computer readable storage medium or media for storage of information, such as computer readable instructions, data structures, program modules, or other data. A non-exhaustive list of examples of computer readable storage media include magnetic cassettes, magnetic tape, magnetic disk storage or other magnetic storage devices, optical disks such as CD-ROM, digital versatile disks (DVD) or other optical storage, volatile and non-volatile, removable and non-removable media implemented in any method or technology, RAM, ROM, EEPROM, flash memory or other memory technology. Any such computer storage media may be part of the device or accessible or connectable thereto. Any application or module herein described may be implemented using computer readable/executable instructions that may be stored or otherwise held by such computer readable storage media.

According to one aspect of the present application, there is provided a method comprising: in the event there is an active data connection, adjusting forward at least once a time at which a source of transmit data is to transmit data if there is data to transmit; and if the source of transmit data has data to transmit at the time, transmitting the data.

According to another aspect of the present application, there is provided a mobile device comprising: at least one antenna; a source of transmit data; at least one radio through which can be established an active data connection; wherein in the event there is an active data connection, a time at which the source of transmit data is to transmit data if there is data to transmit is adjusted forward at least once; and wherein the source of transmit data transmits data at the time if the source of transmit data has data to transmit.

By notifying application level timers that the radio is active, coarse or soft timers can be adjusted backwards slightly to be triggered within the current activity period to try to stimulate application level events to occur together or within existing radio activity. In some instances, this may have the advantageous side effect of harmonizing some timers. This may slightly extend radio activity time in some cases, but saves the up/down power usage.

A simplistic case is as follows: suppose it takes m units of power to startup a modem from idle, n units of power to shutdown the modem to idle, and p units of power to transmit a particular packet while the modem is non-idle. If the modem is in an idle state, then it would take at least n+m+p units of power to transmit that packet. If there are coarse periodic timers being used by applications to transmit data, then expiring those timers earlier may result in a reduction of power consumed of about m+n units.

Referring now to FIG. 1, shown is a flowchart of a method of transmitting data based on timers. The method begins at block 1-1 with starting a timer associated with a source of transmit data. In some embodiments, the timer is configured with a timeout duration. In the normal course of events, when the timer expires, the source of transmit data will transmit data if it has data to transmit. This may involve setting up a data connection if one is not in existence when the timer expires. For some timers, a timer may be configured so as to be allowed to expire within a range of values; this can be thought of as a range of timeout values, or as a "soft timeout value" in the sense that there is a nominal timeout value, but timeout may occur within some offset from the nominal timeout value.

In block 1-2, in the event there is an active data connection, the timer is adjusted at least once. Examples of the type of adjustment that might be performed include:

a) adjusting the timer such that the timer expires before the timeout duration; this may be achieved, for example, by reducing the remaining time on the timer to a value allowed for by the timer's timeout range. For example, if the timer has a timeout range that allows it to be expired 5 seconds earlier than a nominal timeout, then the remaining time on the timer could be reduced by up to 5 seconds.

b) expiring the timer. In some embodiments, the timer is only expired if allowed for by the timer's configuration. For example, the timer may be expired only if the timer is currently within a timeout range defined for the timer.

The timer is adjusted at least once. In some embodiments, one or both of the following two specific examples of when the timer might be adjusted are implemented:

1) adjusting the timer upon the active data connection coming into existence; and 2) adjusting the timer in advance of a time at which the active data connection is to be torn down. This time can be a predicted time, an estimated time, or a known configured time, for example. In some embodiments, once there is further data to transmit, the data connection is kept up even after the time at which the active data connection was to be torn down. In this case, the adjustment in advance of a time at which the active data connection is to be torn down may be repeated.

In block 1-3, if the source of transmit data has data to transmit upon expiry of the timer, data is transmitted. This expiry may be due to the expiry of the timer in the normal course of events, or due to the early expiry due to one or more adjustments to the timer.

The method of FIG. 1 may be performed in parallel for multiple sources of data, for example multiple applications, and/or sources of data in an operating system with a respective timer associated with each source of data, each timer having a respective timeout duration, and possibly an associated timeout range. In some embodiments, when a given timer expires, it is restarted again so that it is again set to expire after the timeout duration.

The method described with reference to FIG. 1 assumes that the transmission of data is tied to the expiry of timers. More generally, an embodiment provides a method in which, in the event there is an active data connection, a time at which a source of transmit data is to transmit data if there is data to transmit is adjusted forward at least once. If the source of transmit data has data to transmit at the time, transmitting the data. In other words, the option to transmit for a given source of data is moved forwards. The source may or may not actually have any data to transmit. The use of a timer can be used to define a time at which a source of transmit data is to transmit data if there is data to transmit. As such, adjusting a timer can be considered a special case of adjusting a time. The remainder of this description focuses on adjusting timers, but it should be understood that these details may also be applied in the more general context of adjusting a time. Where an "active data connection" or a data connection that is active are referred to, this refers to the connectivity to transmit data being in existence, for example a data channel being in a connected state. When no data is being transmitted, the data connection is still "active" until it is torn down.

In some embodiments, adjusting the timer is achieved through a notification mechanism. In such cases, adjusting the timer involves notifying the timer at least once if there is an active data connection. Then, the timer, if notified, adjusts itself such that the timer expires before the timeout duration.

The timer may be notified in one or more of the same circumstances as described previously for timer adjustment. Where notification is performed in advance of a time at which a data connection is to be torn down, the notification may be repeated if the time that the data connection is active is extended.

In this case, the timer may have its own configuration, and can process the notifications in accordance with such a configuration. For example, in the event the timer is configured with a timeout range, the timer can make adjustments that are consistent with the configuration. This two step approach of notifying the timer, and the timer adjusting itself, is a specific example of adjusting the timer.

Figure 2:
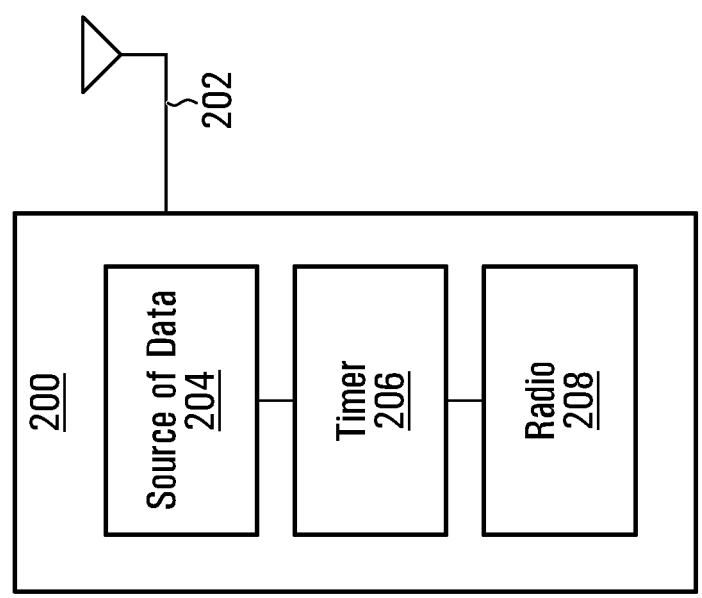
FIGS. 2-4 and 6 are block diagrams of mobile devices configured to transmit data based on timers.

Referring now to FIG. 2, shown is a mobile device 200. The mobile device 200 has one or more antennas 202, and has other features common to mobile devices such as a processor and memory (not shown). The mobile device has at least one source of transmit data 204 which may, for example be an application or part of a core operating system of the device; more generally, any number of sources of transmit data may exist on the mobile device. There is one or more timers 206 associated with the source of transmit data 204. There is at least one radio 208 through which can be established an active data connection. The mobile device is configured to adjust the timer at least once if there is an active data connection. The source of transmit data transmits data 204 upon expiry of the timer if the source of transmit data has data to transmit.

Figure 3:
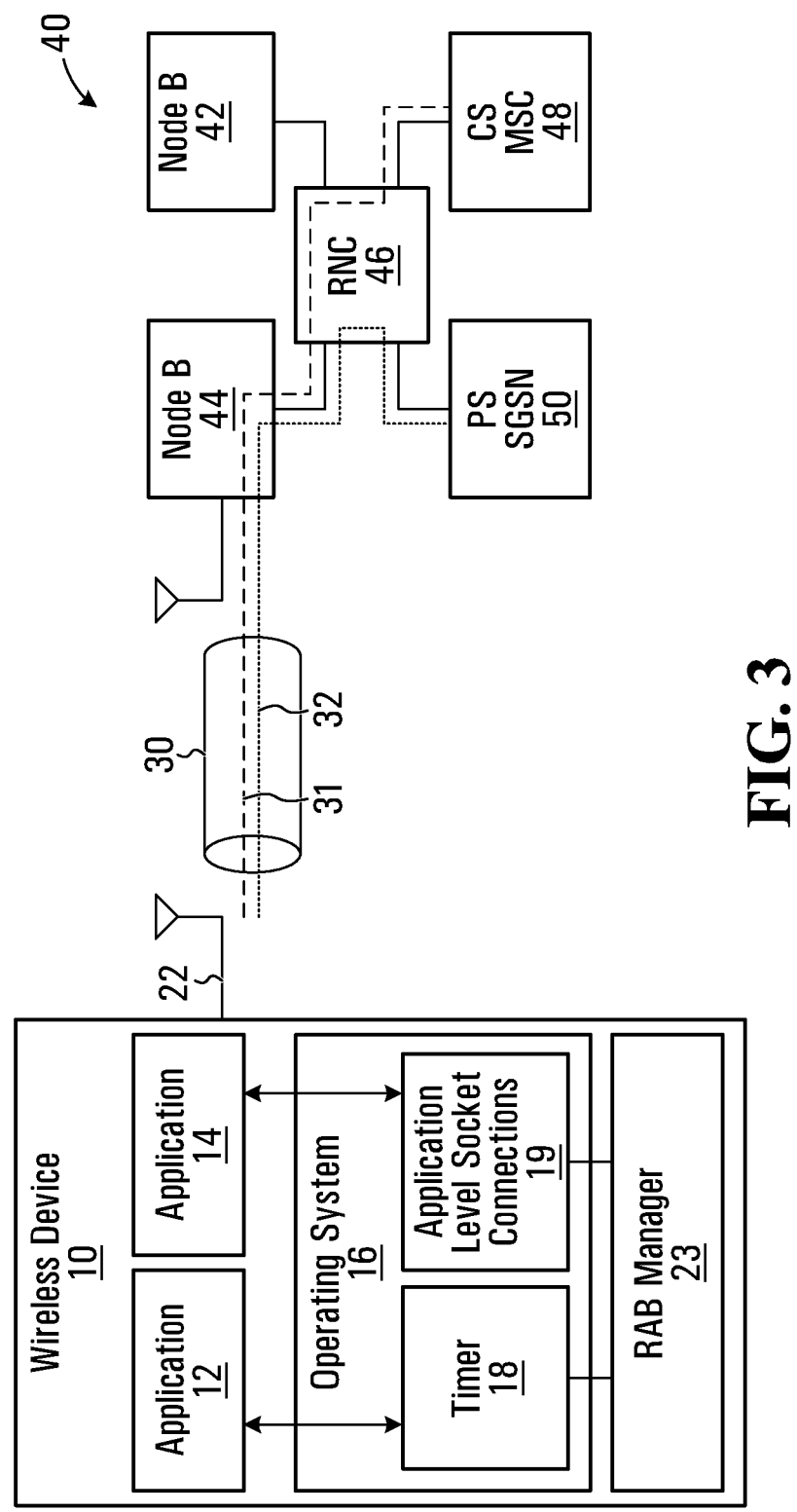

Referring now to FIG. 3 shown is a mobile device 10. The mobile device 10 has one or more antennas 22, and has other features common to mobile devices such as a processor and memory (not shown). The mobile device has applications 12, 14, but more generally, any number of applications may be running on the mobile device, and more generally still, the mobile device has sources of data which may include, for example, applications and/or parts of a core operating system. An operating system 16 is shown which implements timers 18. Each application 12,14 is associated with at least one of the timers 18. This may, for example, be in the sense that when the timer associated with a given application expires, the application is informed. This may, for example, occur by the timer sending a message or calling a function registered by the application when the timer was created. When that occurs, the informed application transmits data if it has data to send. In some embodiments the timers 18 are implemented by a single module in the operating system that has access to a master time. The operating system 16 is also shown with application level socket connections 19 that receive data from the applications 12, 14 and convey this to the RAB manager 23 for subsequent transmission. More generally, any mechanism for transmitting data from the applications 12,14 may be employed.

For the purpose of providing a context, an example network 40 is also depicted in FIG. 3. Shown are two Node B's 42,44 connected to an RNC (radio network controller) 46. The RNC 46 is connected to a CS MSC (mobile switching centre) 48 and to a PS SGSN (Serving GPRS Support Node) 50.

A wireless connection 30 is shown between the mobile device 10 and the network 40. A CS RAB 31, when present, connects the mobile device 10 to the CS MSC 48. A PS RAB 32, when present connects the mobile device to the PS SGSN 50. It is to be understood that the network 40 is a very specific example, and that the mobile device 10 can be used with networks having different configurations. In general, a CS RAB will provide CS connectivity to a CS core network, and a PS RAB will provide PS connectivity to a PS core network. The mobile device 10 controls RABs through a RAB manager 23, for example.

Figure 4:
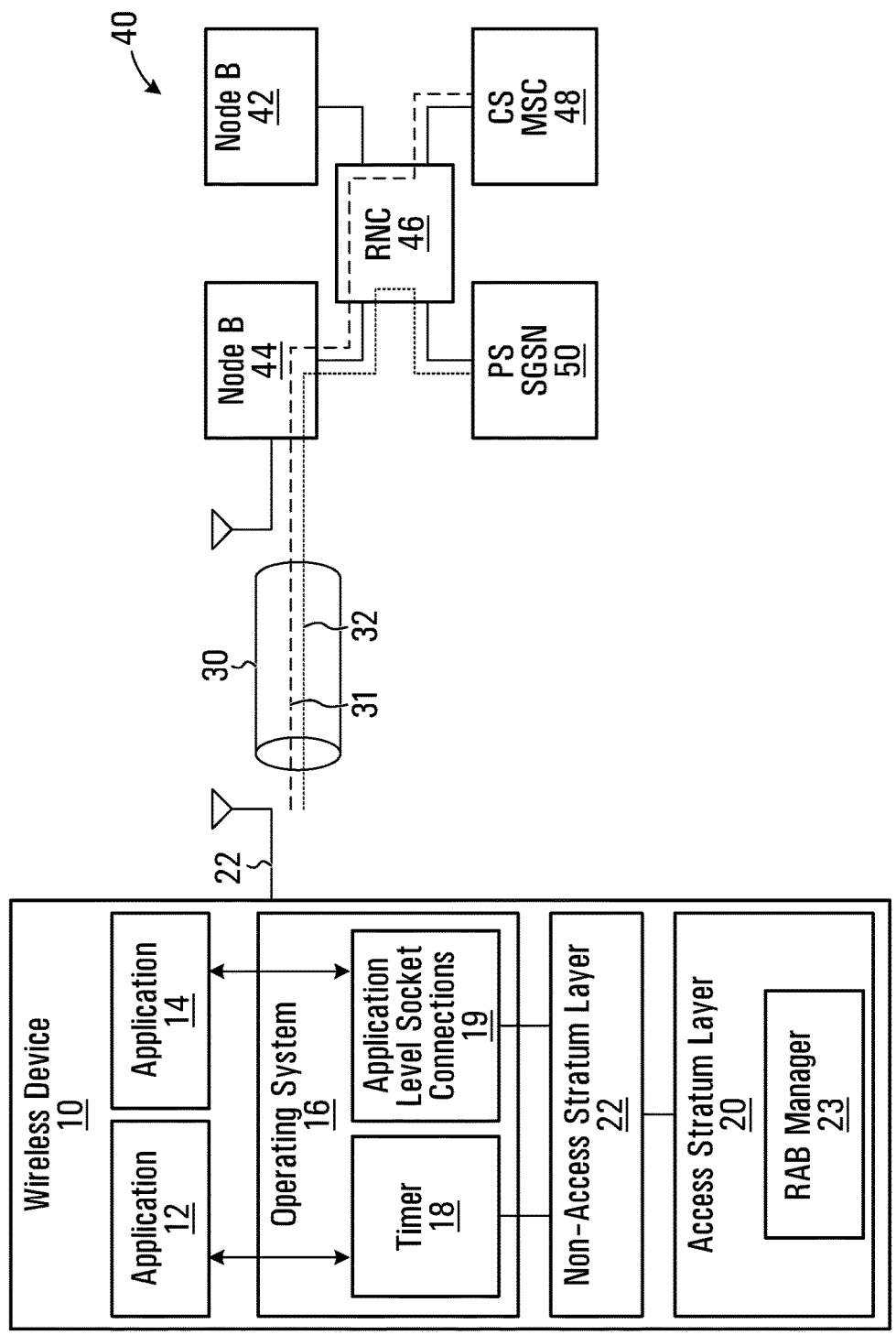

FIG. 4 shows another example of a mobile device which is generally the same as that of FIG. 3, except that the mobile device also has an AS (access stratum) layer 20 which generally includes radio access technology specific functionality, and NAS (non-access stratum) layer 22 which generally includes functionality that is not radio access technology specific. The AS layer 20 can also be referred to as the radio layer. The RAB manager 23 in this case is part of the AS layer 20. The NAS layer 22 can request a logical path/channel for voice or data; from the perspective of the NAS layer 22, the radio access technology (be it 2G, 3G, etc.) is abstracted out.

Figure 6:
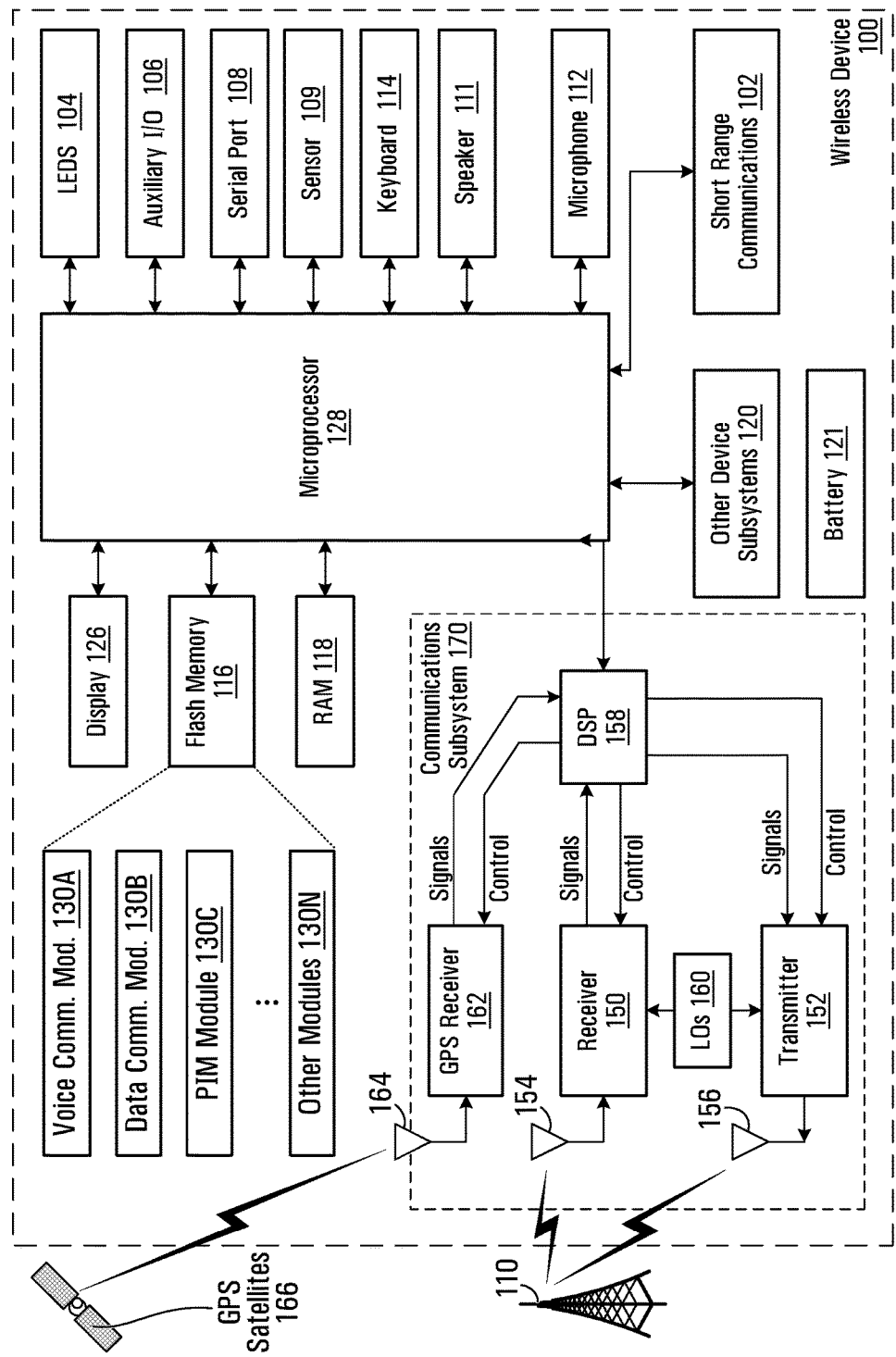

The mobile devices of FIGS. 2, 3 and 4 are examples of mobile devices that might, for example, implement the method of FIG. 1 described above, any of the variants of FIG. 1 described above, or any of the other methods described herein. The mobile device described below with reference to FIG. 6 is another example.

Recall that in some embodiments, the timer is adjusted in advance of a time at which the active data connection is to be torn down. This time can be a predicted time, an estimated time, or a known time, for example. In some embodiments, once there is further data to transmit, the data connection is kept up even after the time at which the active data connection was to be torn down.

Various methods and embodiments can be used to determine or predict when a connection is to be terminated or torn down or when a device is to be transitioned from a connected state (battery intensive state) to a dormant or idle state (less-battery intensive). In some embodiments where, for example, connections or transitions between various states/modes are controlled by the network, the determination can be based on knowledge of a network timer value used to track data inactivity. Knowledge of such a network timer value may be provided to the mobile station through, for example, initial configuration or broadcast information transmitted by the network. In some embodiments, the mobile station may be able to infer the network timer value from previous network behavior.

In other embodiments where for example, the mobile device has more control over connections or state transitions, the determination can be based instead on the parameters the mobile device considers to determine that no further data is expected and hence, a transition should occur or the connection should be terminated.

In some embodiments, mobile devices have some control over when a data connection is torn down. In one example of how a device can transition from one state to another (e.g. from a connected state to a more battery efficient or radio resource efficient state), the mobile device can indicate to the network, either implicitly or explicitly, that a connection should transition from one state or mode to another. As will be appreciated, such a transition indication or request could utilize an existing communication under current standards, for example a SIGNALING CONNECTION RELEASE INDICATION message, or could be a new dedicated message to change the state of the mobile device, such as a "preferred RRC state request" or a "data transfer complete indication message". In this example, the transition indication includes a cause code to allow the mobile device to specify a cause for the transition indication (e.g. to indicate that a data transfer or call is complete, or that no further data is expected for a prolonged period). A specific example is the SIGNALLING CONNECTION RELEASE INDICATION defined in 3GPP TS 25.331 Section 8.1.14 where the cause code is the IE "Signalling Connection Release Indication Cause" set to "UE Requested PS Data session end". Other embodiments may not include a cause code. Other transition indication messages are also possible. See also CR R2-087149 in Appendix A. Further examples are provided in Appendix B and Appendix C. From the perspective of the mobile device, once such a request has been sent, the data connection is expected to be torn down. In some embodiments, the mobile device makes the decision to send a transition indication, but sends the transition indication after a delay to ensure there is no more data to send. Equivalently, the mobile station may wait for an inactivity period before deciding to send the transition indication. In either case, the mobile station is aware of a delay period following which the connection may be torn down.

The transition indication originated by the mobile device can be sent in some situations when one or more applications on the mobile device have completed an exchange of data and/or when a determination is made that the mobile device application(s) are not expected to exchange any further data. The network element can then use the indication and any information provided therein, as well as other optional information related to the radio resource, such a quality of service, Access Point Name (APN), Packet Data Protocol (PDP) context, historical information, among others, defined herein as a radio resource profile, to make a network specific decision about whether to transition the mobile device to another mode or state, or do nothing. The transition indication provided by the mobile device or mobile device can take several forms and can be sent under different conditions. In a first example, the transition indication can be sent based on a composite status of all of the applications residing on the mobile device. Specifically, in a UMTS environment (other network environments are possible), if an application on the mobile device determines that it is done with the exchange of data, it can send a "done" indication to a "connection manager" component of mobile device software. For example, an email application on the device sends an indication that it has received an acknowledgement from the push email server that the email was indeed received by the push server. The connection manager can, in one embodiment, keep track of all existing applications (including those providing a service over one or multiple protocols), associated Packet Data Protocol (PDP) contexts, associated packet switched (PS) radio resources and associated circuit switched (CS) radio resources. A PDP Context is a logical association between a mobile device and PDN (Public Data Network) running across a UMTS core network. One or multiple applications (e.g. an e-mail application and a browser application) on the mobile device may be associated with one PDP context. In some cases, one application on the mobile device is associated with one primary PDP context and multiple applications may be tied with secondary PDP contexts. If a connection manager is used, the connection manager receives "done" indications from different applications on the mobile device that are simultaneously active. For example, a user may receive an e-mail from a push server while browsing the web. After the e-mail application has sent an acknowledgment, it may indicate that it has completed its data transaction. The browser application may behave differently and instead make a predictive determination (for e.g. using an inactivity timer) of when to send a "done" indication to the connection manager. In other embodiments a network element (e.g. the UTRAN) can keep track of existing applications, associated PDP contexts, QoS, associated PS radio resources and associated CS radio bearers. A delay can be introduced at either the mobile device or network element to ensure that the application(s) is (are) truly finished with data exchange and no longer require an RRC connection even after the "done" indication(s) have been sent. This delay can be made equivalent to an inactivity timeout associated with the application(s) or the mobile device. Each application can have its own inactivity timeout and thus the delay can be a composite of all of the application timeouts. For example, an email application can have an inactivity timeout of five seconds, whereas an active browser application can have a timeout of sixty seconds. An inhibit duration timer can further delay sending of a transition indication.

In this example, based on a composite status of such indications from active applications, mobile device software can decide to send a transition indication to indicate or request of the network that a transition from one state or mode to another should occur. Alternatively, the mobile device software can instead wait before it sends the transition indication and introduce a delay to ensure that the application is truly finished with data exchange and does not require to be maintained in a battery or radio resource intensive state or mode. The delay can be dynamic based on traffic history and/or application profiles. Whenever the connection manager determines with some probability that no application is expected to exchange data, it can send a transition indication to the network to indicate that a transition should occur. In a specific example, the transition indication can be a signaling connection release indication for the appropriate domain (e.g. PS domain) to request a transition to an idle mode. Alternatively, the transition indication could be a request for state transition within connected mode to the UTRAN.

Other transition indications are possible. For example, instead of relying on a composite status of all active applications on the mobile device, the mobile device software can, in an alternative embodiment, send a transition indication every time a mobile device application has completed an exchange or data and/or the application is not expected to exchange further data. In this case, the network element (e.g. the UTRAN), can utilize the indication to make a transitioning decision. In yet another example, the transition indication could simply indicate that one or more applications on the mobile device completed a data exchange and/or that the mobile device application(s) are not expected to exchange any further data. Based on that indication, the network (e.g. UTRAN), can decide whether or not to transition the mobile device to a more appropriate state or mode or operation. In a further example, the transition indication could be implicit rather than explicit. For example, the indication may be part of a status report sent periodically. Such a status report could include information such as whether a radio link buffer has data or could include information on outbound traffic.

When the mobile device sends a transition indication it may include additional information in order to assist the network element in making a decision to act on the indication. This additional information would include the reason or cause for the mobile device to send the message. This cause or reason (explained below in greater detail) would be based on the mobile device determining a need for "fast dormancy" like behavior. Such additional information may be by way of a new information element or a new parameter within the transition indication message.

In a further embodiment, a timer could exist on the mobile device to ensure that a transition indication may not be sent until a time duration has elapsed (inhibit duration) since a previous transition indication was sent. This inhibit timer restricts the mobile device from sending the transition indication message too frequently and further allows the network to make a determination by relying on messages that are triggered only with a given maximum frequency. The time duration could be determined by a timer whose value is preconfigured, or set by a network (indicated or signaled). If the value is set by a network, it could be conveyed in new or existing messages such as RRC Connection Request, RRC Connection release, Radio Bearer Setup, UTRAN Mobility Information or a System Information Block, among others, and could be an information element in those messages. The value could alternatively be conveyed in an inhibit transition indication portion of an RRC connection setup message sent by the UTRAN in response to an RRC connection request message received from the mobile device, for example.

The use of the delay referred to above, or a delay before which a data connection is expected to be torn down determined using some other mechanism, allows the mobile device to determine in advance that the data connection is expected to be torn down. This window of time (delay period) can then be used to transmit data for sources of data whose timers have been adjusted. For example, the timer for a given source of data can be advanced so as to expire at the start of the delay period following the decision that a transition indication should be sent. Alternatively, the timer can be advanced to some later point in the delay period. The start of such a delay period can be defined, for example, by starting a timer with a timeout duration; the end of the delay period is then defined by the expiry of the timer.

In some embodiments, the mobile device has multiple radios with different capabilities, and the notifications that are generated are a function of which radio is active at a given time. In a specific example, the mobile device is configured with radios that include a first radio for which a time at which the active data connection is to be torn down can be determined (be it through estimation, prediction, or configuration), and a second radio. When the first radio is active, notifications to adjust timers are sent at the start of radio activation and in advance of a time at which the active data connection is to be torn down. When the second radio is active, notifications to adjust timers are sent at the start of radio activation.

TIMING EXAMPLE

Figure 5:
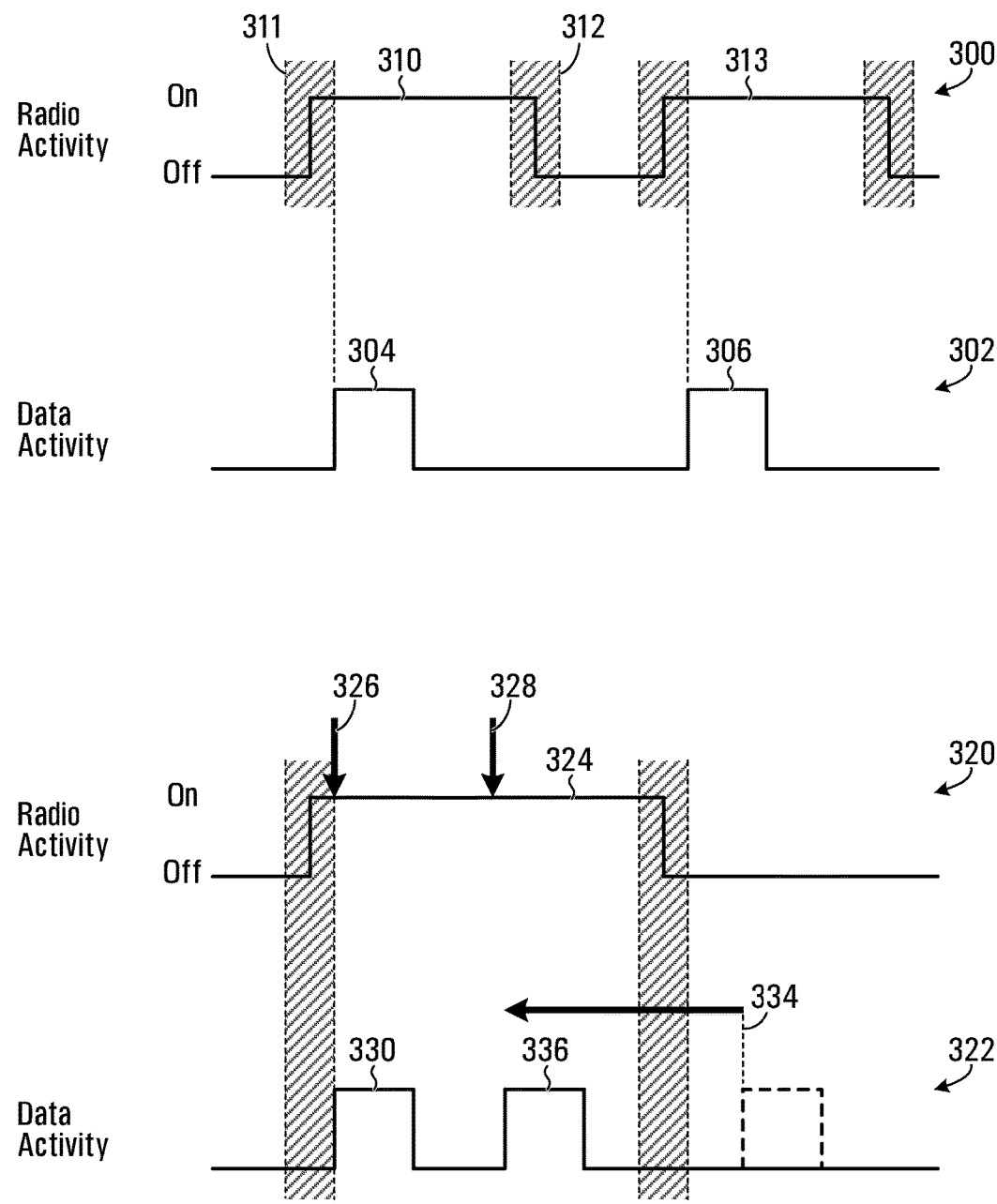
FIG. 5 depicts two example scenarios.

Referring now to FIG. 5, specific timing adjustment scenarios will be described. A first scenario that does not feature timer adjustment includes radio activity 300 and data activity 302. Generally indicated at 300 is an example of radio activity having on and off states. While in the on state, a data connection is available, and while in the off state, no data connection is available. Two periods of radio activity are shown indicated at 310,313. Each period of radio activity has a set up and teardown period. For example, period 310 has set up period 311 and teardown period 312. Also shown generally indicated at 302 is data transmission activity having on and off states. While in the on state, data transmission is occurring, while in the off state, data transmission is not occurring. Two periods of data transmission 304,306 are depicted. Here, it can be seen that not long after the period 310 during which the radio is active, the radio must be again turned on to provide data connectivity for data transmission 306.

A second scenario that does feature timer adjustment includes radio activity 320 and data activity 322. Generally indicated at 320 is an example of radio activity having on and off states. While in the on state, a data connection is available, and while in the off state, no data connection is available. One period of radio activity are shown indicated at 324. Also shown generally indicated at 322 is data transmission activity having on and off states. While in the on state, data transmission is occurring, while in the off state, data transmission is not occurring. Two periods of data transmission 330,336 are depicted. Also shown are notifications to timers 326 and 328. Notification 326 is a notification that takes place at the start of the period during which a data connection is available. Notification 328 is a notification that takes place before a time when the data connection is to be torn down. In this specific example the notification indicates there are 2 seconds remaining. Note that notification 328 may potentially be repeated if the data connection is held up longer. Also shown at 334 is a time at which a timer was set to expire. In the depicted scenario, the notification results in the adjustment of timer such that it expires during period 324. As a result, data transmission 336 takes place during period 324.

Adjust Time Based on Historical Behaviour

In some of the embodiments described above, the time at which a source of transmit data is to transmit is adjusted forward at least once when there is an active data connection. In some cases, this is done by starting a delay period, and then adjusting forward the time so as to occur during the delay period, for example by adjusting timers to expire earlier.

In a specific example, when there is no data activity, the mobile station starts an inactivity timer having a timeout duration; when the timer times out, if no data has been sent, the mobile station sends a request to the network to transition to a less power intensive state, for example by transmitting a SCRI. In some implementations, the timeout duration is 2 s.

If the notified source(s) of data have more data, the active data connection is kept up. On the other hand, if the notified source(s) of data have no more data, then when the timer expires, the data connection is torn down. More generally, here, and in the following, the mobile station can be transitioned to a less power intensive state.

In some embodiments, the times are advanced so as to occur in advance of a time at which the data connection is expected to be torn down. Use of the above-referenced inactivity timer is an example of this.

In some embodiments, rather than using a fixed timer, after data activity stops, a prediction is made of a length of time the data connection will be maintained. Note where the expression "data activity stops" is used, "inactivity timer" above, this is referring to the actual transmission of data on a data connection in a connected state. The data connection can still be active, in the sense of not being torn down, but at the same time inactive in the sense that no data has been transmitted. Then, based on the predicted length of time, a decision is made as to whether or not to advance the time(s) for the source(s) of data to transmit data if there is data to transmit, for example by notifying timers. As noted previously, this moves forward the option for the source(s) of data to transmit. They may or may not actually have data to transmit. In some embodiments, the time(s) are advanced if the predicted length of time is greater than a threshold. This approach can still be used in the context of a system in which the mobile station requests the network to tear down the data connection after an inactivity period, for example through the use of a SCRI. The predicted length of time, determined on the basis of historical behavior, can be longer than the inactivity period. For example, while the mobile station may send a request for the data connection to be torn down after 2 seconds of inactivity, based on historical behavior, the mobile station may predict that the current data session will actually stay on for another 4 seconds.

More generally, a decision is made as to whether or not to advance the time(s) for the source(s) of data to transmit based on historical behavior in terms of how long the data connections last.

In some embodiments, historical data is maintained for one or more contexts that measures how long a data connection stays up following a time at which it is determined that there is no more data to send, and the time(s) are advanced or not based on this information.

In some embodiments, historical behavior is maintained by tracking a histogram of data connection on-durations. For example, data connection on-durations might be tracked in 1 second bins. Then, if there is sufficient weight in the histogram above a threshold time, the decision can be made to advance the times.

The following is a specific example. Assume that at least 50% of the histogram must be consistent with the data connection staying up for an additional 4 seconds in order for times to be advanced. The histogram is maintained, and at the instant in time under consideration, reflects the following:

|  | 0% | 20% | 20% | 30% | 20% | 5% | 5% |
|---|---|---|---|---|---|---|---|
| Data connection duration: | 1 s | 2 s | 3 s | 4 s | 5 s | 6 s | >7 s |

Assume that at the time that the assessment has been made (e.g. after the data connection becomes inactive), the data connection has been up for 2 seconds. From the histogram, it can be seen that only in 10% of the time is the connection maintained for an additional 4 seconds, so the times are not advanced.

If on the other hand, at the instant in time under consideration, the histogram reflects the following:

|  | 0% | 0% | 0% | 10% | 20% | 40% | 20% | 10% |
|---|---|---|---|---|---|---|---|---|
| Data connection duration: | 1 s | 2 s | 3 s | 4 s | 5 s | 6 s | 7 s | >8 s |

Assume again that at the time that the assessment has been made (e.g. after the data connection becomes inactive), the data connection has been up for 2 seconds. From the histogram, it can be seen that in 70% of the time is the connection maintained for an additional 4 seconds or longer, so the times are advanced.

In some embodiments, the prediction is made/historical behavior maintained for different contexts. For example, a first prediction can be made/historical behavior maintained for the mobile device while its LCD (liquid crystal display) is on, a second prediction can be made/historical behavior maintained for the mobile device while its LCD is off.

In some embodiments, predictions/historical behaviors can be made/maintained as a function of which applications are active. In some embodiments, predictions/historical behaviors can be made/maintained as a function of different power states of the mobile device.

In some embodiments, the prediction/historical behavior can be maintained for a combination of two or more of the above described criteria.

The longer a device is in use in a given context, the better the predictions will be for that context. In some embodiments, history is maintained for some period of time after which it is cleared. In some embodiments, the history is maintained on a sliding window basis.

Another Mobile Device

Referring now to FIG. 6, a block diagram is shown of an embodiment of another mobile device 100 that may implement any of the device methods described herein. It is to be understood that the mobile device 100 is shown with very specific details for exemplary purposes only.

The mobile device 100 has a housing that may be elongated vertically, or may take on other sizes and shapes (including clamshell housing structures). The keyboard 114 may include a mode selection key, or other hardware or software for switching between text entry and telephony entry. Alternatively, the mobile device 100 may have a housing that does not take on other sizes and shapes.

A microprocessor 128 is shown schematically as coupled between a keyboard 114 and a display 126. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The keyboard 114, speaker 111, microphone 112, display 126, and LEDs 104 are part of the user-interface.

The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system.

Additional software modules, illustrated as another software module 130N, may be installed during manufacture. The software modules may, for example, include one or more modules that control the execution of the methods described above.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (Los) 160.

The specific design and implementation of the communication subsystem 170 is dependent upon the communication network in which the mobile device 100 is intended to operate. For example, the communication subsystem 170 of the mobile device 100 may be designed to operate using 3GPP and/or 3GPP2 data technologies, including for example, UMTS, HSPA, LTE etc. and CDMA, 1×RTT, EVDO, etc. and/or to operate using OFDM or with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, (often referred to as a SIM card), in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are known in the art and are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practiced otherwise than as specifically described herein.

The invention claimed is:

1. A method in a mobile device comprising:
   setting a timer associated with a source of transmit data to expire at a timeout duration, expiry of the timer defining a time at which the source of transmit data is to transmit data if there is data to transmit;
   during an active data connection with a network:
      determining that the active data connection is to be torn down;
      in response to determining that the active data connection is to be torn down, starting a delay timer having an active connection timeout duration defining a delay period such that the active connection is torn down upon the expiry of the active connection timeout duration;
      adjusting the timer at least once such that the timer expires prior to the expiry of the delay timer and the active data connection being torn down and before the timeout duration of the timer; and
      if the source of transmit data has data to transmit at the time, transmitting the data prior to the active data connection being torn down.

2. The method of claim 1 wherein adjusting the timer comprises:
   notifying the timer at least once if there is an active data connection that is to be torn down;
   the timer, if notified, adjusting itself such that the timer expires before the timeout duration and before the active data connection is torn down.

3. The method of claim 1 further comprising:
   restarting the timer after expiry so that it is again set to expire after the timeout duration.

4. The method of claim 1 further comprising:
   performing the method for each of a plurality of timers, each timer having a respective timeout duration, and each timer associated with a respective source of transmit data.

5. The method of claim 4 wherein each source of transmit data is an application or a source of transmit data within an operating system.

6. The method of claim 1 wherein adjusting the timer at least once comprises at least one of:
   adjusting the time upon the active data connection coming into existence; and
   adjusting the time in advance of a time at which the active data connection is to be torn down in the absence of further data to transmit.

7. The method of claim 2 wherein notifying the timer at least once if there is an active data connection comprises at least one of:
   notifying the timer upon the active data connection coming into existence; and
   notifying the timer in advance of a time at which the active data connection is to be torn down in the absence of further data to transmit.

8. The method of claim 1 further comprising:
   after the delay period, if no data has been transmitted on the active data connection during the delay period, sending a transition indication to request a network to transition the active data connection from one state or mode to another.

9. The method of claim 8 wherein the transition indication comprises a signaling connection release indication message.

10. The method of claim 1 wherein starting a delay period comprises one of:
    receiving an indication from at least one application that the application has no more data to send;
    starting the delay period based upon receiving the indication.

11. The method of claim 1 wherein starting a delay period comprises one of:
    for each of a plurality of applications, receiving a respective indication from each the application that the application has no more data to send; and
    starting the delay period based upon receiving the indications.

12. The method of claim 1 further comprising:
    upon expiry of the delay period, the mobile device sending a signaling connection release indication if no data was sent during the delay period.

13. The method of claim 1 wherein adjusting the timer comprises expiring the timer subject to a defined timeout range for the timer.

14. The method of claim 1 wherein adjusting the timer comprises:

notifying the timer at least once if there is an active data connection;

upon being notified, the timer performing at least one of:

a) reducing a remaining time on the timer subject to a defined timeout range for the timer;

b) expiring the timer subject to a defined timeout range for the timer.

15. The method of claim 1 further comprising:

tracking historical behavior in terms of how long data connections last;

making a decision as to whether or not to adjust the timer based on historical behavior in terms of how long the data connections last; and performing the adjusting or not based on the decision.

16. The method of claim 1 further comprising:

tracking historical behavior for a plurality of different contexts;

making a decision as to whether or not to adjust the timer based on the historical behavior for a current context.

17. The method of claim 16 wherein the plurality of different contexts include at least one of:

whether or not an LCD (liquid crystal display) is on;

which network the mobile device is operating in;

which radio access technology the mobile device is using;

which network and radio access technology combination the mobile device is operating in and using;

which applications are active.

18. The method of claim 15 wherein:

tracking historical behaviour in terms of how long data connections last comprises maintaining a histogram of data connection times;

making a decision as to whether or not to adjust the timer comprises determining based on the histogram whether the current active data connection is sufficiently likely to stay up for at least a predetermined additional duration.

19. The method of claim 15 wherein making a decision as to whether or not to adjust the timer comprises:

predicting a length of time that the current active data connection will stay up;

if the predicted length of time is longer than a threshold, making the decision to adjust the timer.

20. A non-transitory computer readable medium having stored thereon instructions for execution by a mobile device, which when executed cause the mobile device to execute the method of claim 1.

21. A mobile device comprising:

at least one radio through which can be established an active data connection, the radio having at least one antenna;

a source of transmit data;

a processor coupled to the at least one radio and the source of transmit data, the processor configured to:

set a timer associated with the source of transmit data to expire at a timeout duration, expiry of the timer defining a time at which the source of transmit data is to transmit data if there is data to transmit;

during an active data connection with a network:

determine that the active data connection is to be torn down;

in response to determining that the active connection is to be torn down, start a delay timer having an active connection timeout duration defining a delay period such that the active connection is torn down upon the expiry of the active connection timeout duration;

adjust the timer at least once such that the timer expires prior to the expiry of the delay timer and the active data connection being torn down and before the timeout duration of the timer; and if the source of transmit data has data to transmit at the time, transmitting the data prior to the active data connection being torn down.

* * * * *